(12) United States Patent
Beranek et al.

(10) Patent No.: US 9,660,757 B2
(45) Date of Patent: May 23, 2017

(54) LOW LATENCY FIBER OPTIC LOCAL AREA NETWORK

(71) Applicants: Mark Beranek, Hollywood, MD (US); Robert Boyd, St. Leonard, MD (US); Nicholas Peterson, Lexington Park, MD (US)

(72) Inventors: Mark Beranek, Hollywood, MD (US); Robert Boyd, St. Leonard, MD (US); Nicholas Peterson, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 45 days.

(21) Appl. No.: 14/734,186

(22) Filed: Jun. 9, 2015

(65) Prior Publication Data
US 2016/0365941 A1    Dec. 15, 2016

Related U.S. Application Data

(60) Provisional application No. 62/013,314, filed on Jun. 17, 2014.

(51) Int. Cl.
*H04J 14/02* (2006.01)
*H04B 10/272* (2013.01)
*H04B 10/278* (2013.01)

(52) U.S. Cl.
CPC ........ *H04J 14/0282* (2013.01); *H04B 10/272* (2013.01); *H04B 10/278* (2013.01); *H04J 14/028* (2013.01); *H04J 14/0284* (2013.01)

(58) Field of Classification Search
None
See application file for complete search history.

(56) References Cited

U.S. PATENT DOCUMENTS

| | | | | |
|---|---|---|---|---|
| 6,449,073 B1 * | 9/2002 | Huber | ............... | H04J 14/02 385/16 |
| 6,771,905 B1 * | 8/2004 | Bortz | ............... | H04J 14/02 398/45 |

OTHER PUBLICATIONS

Department of Defense, Military Standard Aircraft Internal Time Division Command / Response Multiplex Data Bus, MIL-STD-1553A, Apr. 30, 1975.

* cited by examiner

*Primary Examiner* — Darren E Wolf
(74) *Attorney, Agent, or Firm* — Mark O. Glut; NAWCAD

(57) ABSTRACT

The present invention is directed to a low latency fiber optic local area network with a network and a plurality of nodes connected through optical fibers. Each node has a plurality of bi-directional input/output interfaces. Each bi-directional input/output interface has a demultiplexer, at least one optical power coupler, a plurality of wavelength converters, and a plurality of internal optical waveguides. The internal optical waveguides extend from each wavelength converter and are for communication with the demultiplexer, the input fiber optic interface, and the optical fiber. Each optical power coupler has a fiber optic output interface for communication with other nodes, and each demultiplexer has a input fiber optic interface for communication with other nodes.

9 Claims, 3 Drawing Sheets

LOW LATENCY FIBER OPTIC LOCAL AREA NETWORK

CROSS-REFERENCES

The present application claims the benefit of Provisional Application No. 62/013,314 filed Jun. 17, 2014. The provisional application is incorporated herein by reference.

STATEMENT OF GOVERNMENT INTEREST

The invention described herein may be manufactured and used by or for the Government of the United States of America for governmental purposes without payment of any royalties thereon or therefor.

BACKGROUND

Local area networks (LANs) are typically used to route data signals in and between end systems. An avionics LAN is used to interconnect multiple aircraft systems (e.g., Vehicle Management, Stores Management, Navigation, Communications, Mission Processing, Electronic Warfare) and lower level sub-system components that make up systems (e.g., computers, antennas, cockpit electronics, data storage devices, within an aircraft). Wavelength Division Multiplexing (WDM) is the use of multiple carrier signals, utilizing different wavelengths of light, to carry multiple data streams simultaneously though an optical fiber or waveguide. The connectivity and data throughput of a WDM LAN increases with the use of additional carrier wavelengths. Besides this expansion in signal capacity, a LAN based on WDM technology also offers the benefits inherent in any fiber optic system (e.g., high bandwidth, low loss, light weight, small size, immunity to electromagnetic interference and electromagnetic tapping).

Current methods for routing data signals are based on a bus protocol such as MIL-STD-1553 (incorporated by reference and not admitted to be prior art) and networking protocols such as FibreChannel and Ethernet. These methods work fine in federated avionics architectures whereby systems are physically separated from one another via sub-networks that are not connected to one another. Federated architecture drawbacks include lack of network reconfigurability, lack of protocol independence, limited redundancy, significant space, weight and power penalties, and limited ability to upgrade, add or change aircraft node clients.

SUMMARY

The present invention is directed to a system with the needs enumerated above and below.

The present invention is directed to a low latency fiber optic local area network with a plurality of nodes connected through optical fibers. Each node has a plurality of bi-directional input/output interfaces. Each bi-directional input/output interface has a demultiplexer, at least one optical power coupler, a plurality of wavelength converters, and a plurality of internal optical waveguides. The internal optical waveguides extend from each wavelength converter and are for communication with the demultiplexer, input fiber optic interface, and the optical fiber. Each optical power coupler has a fiber optic output interface for communication with other nodes, and each demultiplexer has an input fiber optic interface for communication with other nodes.

It is a feature of the present invention to provide a low latency fiber optic local area network that includes nodes that route data signals between multiple end systems and within subsystems.

It is a feature of the present invention to provide a low latency fiber optic local area network that uses wavelength conversion to route signals between its input/output ports.

It is a feature of the present invention to provide a low latency fiber optic local area network that is compatible with existing star, switch and bus architectures, and future mesh architecture designs.

DRAWINGS

These and other features, aspects and advantages of the present invention will become better understood with reference to the following description and appended claims, and accompanying drawings wherein:

DESCRIPTION

Figure 1:
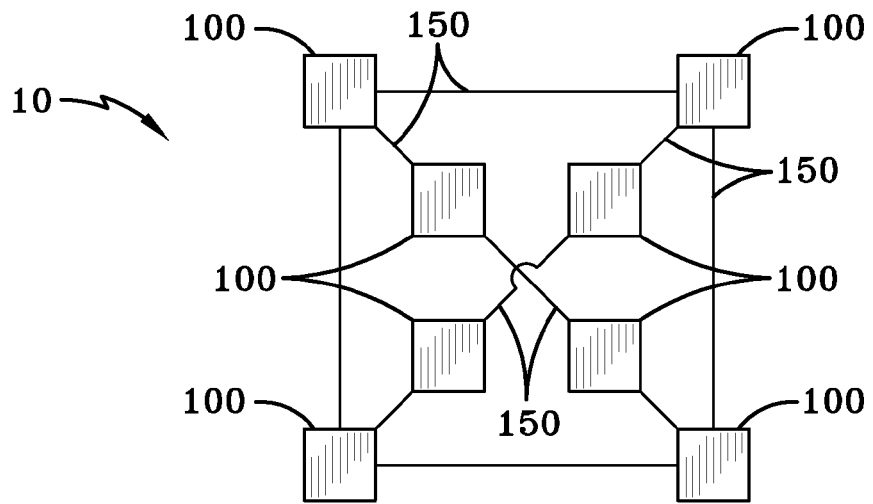
FIG. 1 is an embodiment of the low latency fiber optic local area network.
Figure 2:
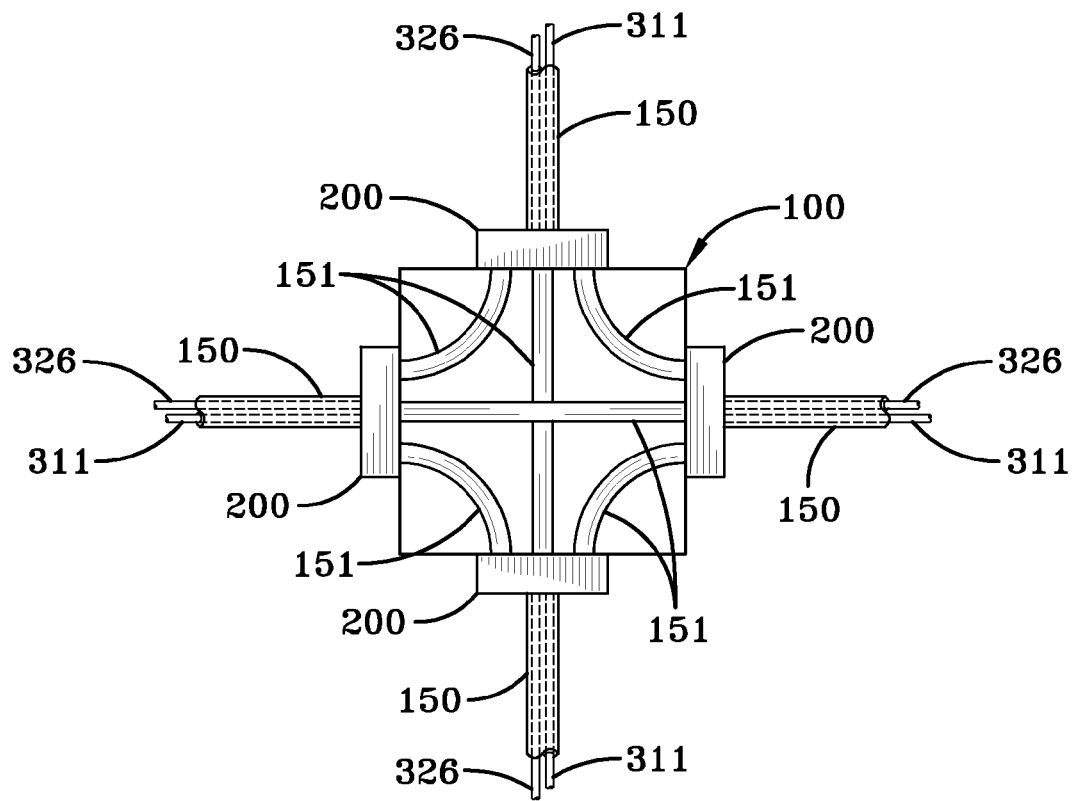
FIG. 2 is an embodiment of a node.
Figure 3:
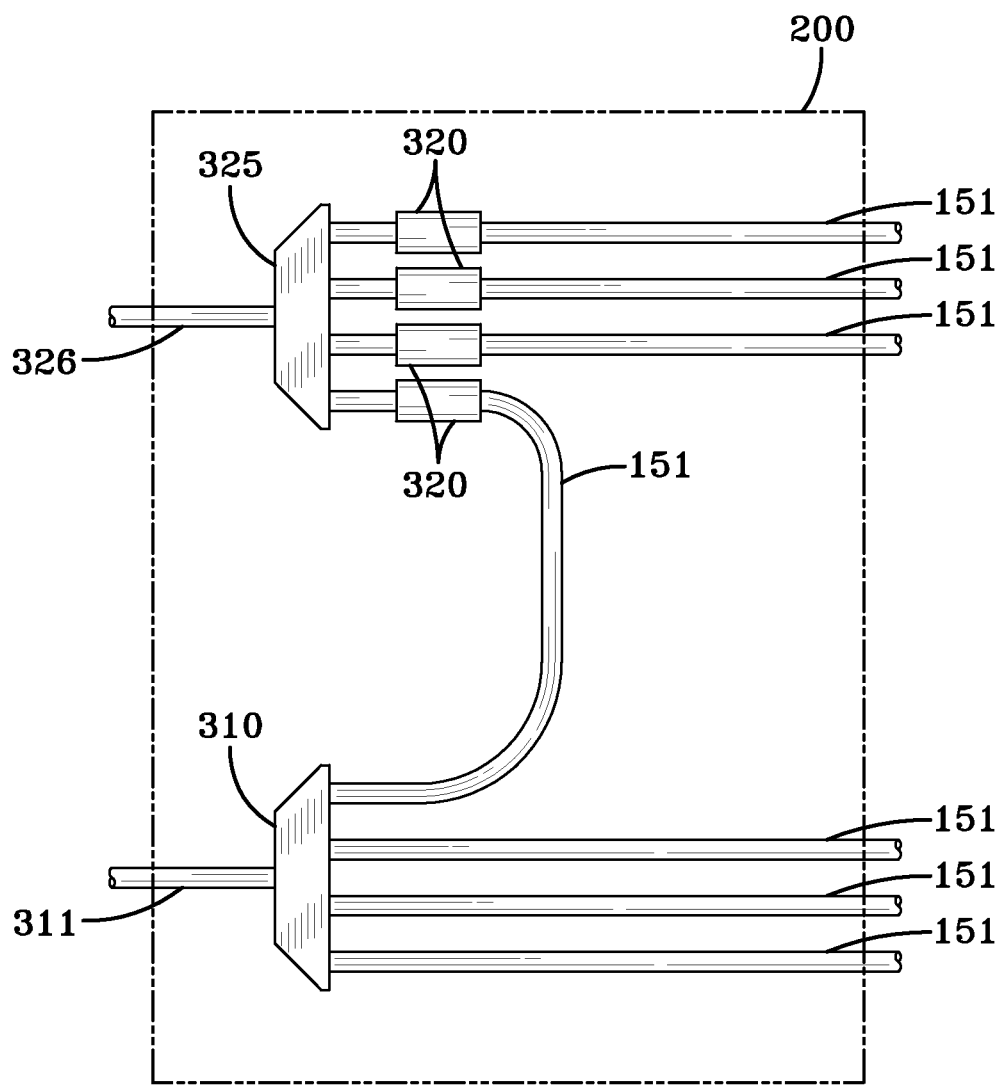
FIG. 3 is an embodiment of a bi-directional input/output interface.

The preferred embodiments of the present invention are illustrated by way of example below and in FIGS. 1-4. As shown in FIG. 1, the low latency fiber optic local area network includes a network 10 and a plurality of nodes 100 connected through optical fibers 150. As shown in FIG. 2, each node 100 has a plurality of bi-directional input/output interfaces 200. As shown in FIG. 3, each bi-directional input/output interface 200 has a demultiplexer 310, at least one optical power coupler 325, a plurality of wavelength converters 320, and a plurality of internal optical waveguides 151. The internal optical waveguides 151 extending from each wavelength converter 320 are for receiving signals from other bi-directional input/output interfaces 200 within the node 100. The internal optical waveguides 151 extending from the demultiplexer 310 are for communicating with the wavelength converters 320 and other bi-directional input/output interfaces 200. Each optical power coupler 325 has a fiber optic output interface 326 for communication with other nodes 100 (particularly with other demultiplexers 310 within other nodes 100). Each demultiplexer 310 has an input fiber optic interface 311 for communication with other nodes 100 (particularly other optical power couplers 325 within other nodes 100), and internal optical waveguides 151 for transmitting signals to other input/output interfaces 200 within the node 100. As shown in FIG. 2, the fiber optic output interfaces 326 and the input fiber optic interfaces 311 may be disposed within the optical fiber cables 150.

In the description of the present invention, the invention will be discussed in a military aircraft environment; however, this invention can be utilized for any type of application that requires use of a local area network.

Figure 4A:
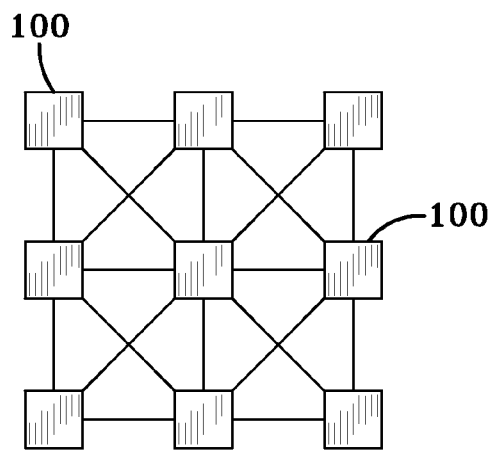
FIG. 4a is an embodiment of a mesh network.
Figure 4B:
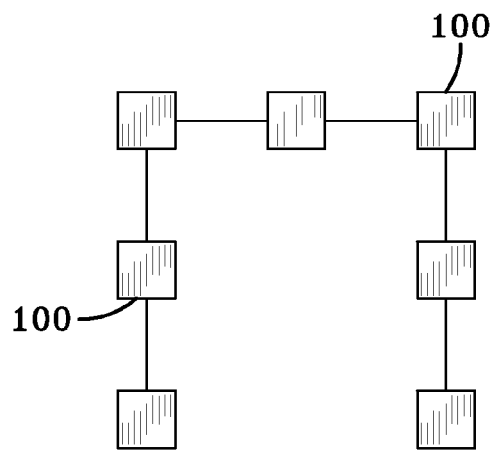
FIG. 4b is an embodiment of a bus network.
Figure 4C:
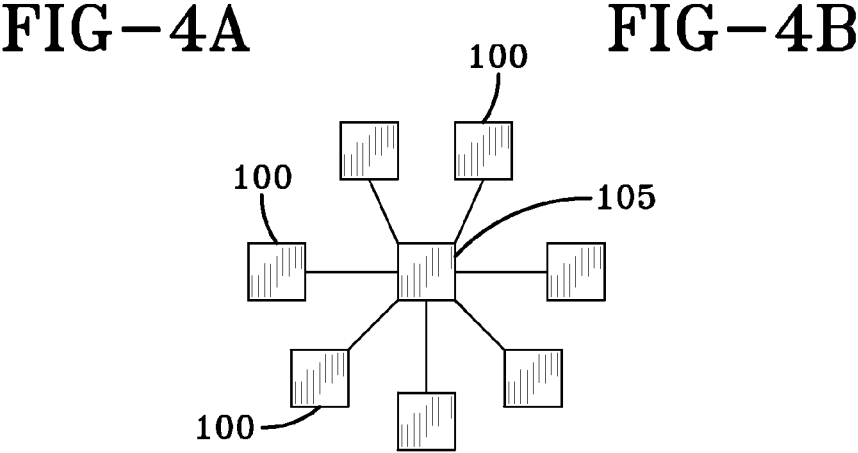
FIG. 4c is an embodiment of a star network.
Figure 4D:
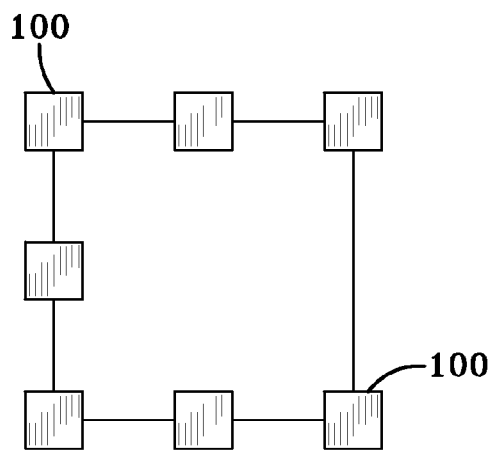
FIG. 4d is an embodiment of a ring network.
Figure 4E:
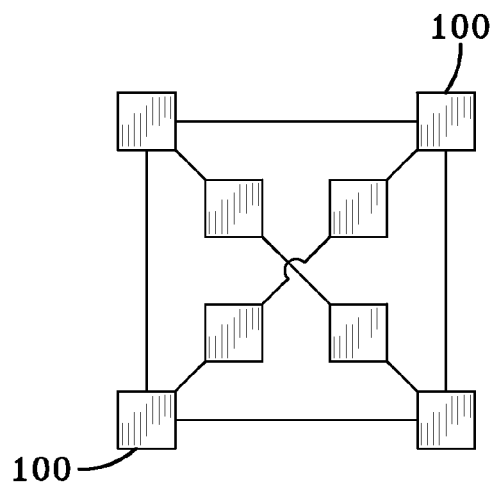
FIG. 4e is an embodiment of a partially connected network.

The network can be mesh network (FIG. 4a), a bus network (FIG. 4b), a star network (FIG. 4c), a ring network (FIG. 4d), or a partially connected mesh (FIG. 4e). A mesh network typically uses a network topology in which each node 100 (called a mesh node) relays data for the network. In a mesh network all nodes 100 cooperate in the distribution of data in the network. A bus network is a network topology in which nodes 100 are connected in a daisy chain by a linear sequence of buses. In its simplest form, as shown in FIG. 4c, a star network has one central switch, hub or computer, which acts as a conduit to transmit messages. It has a central node 105, to which all other nodes 100 are connected; this central node 105 provides a common connection point for all nodes 100 through a hub. In star topology, every node 100 (computer workstation or any other peripheral) is connected to a central node 105 called a hub or switch. A ring network, shown in FIG. 4d, is a network topology in which each node 100 connects to exactly two other nodes 100, forming a single continuous pathway for signals through each node—a ring. Data travels from node 100 to node 100, with each node 100 along the way handling every signal. The preferred network, shown in FIG. 4e, is a partially connected mesh to maximize throughput and fault tolerance is a partially connected mesh network, tailored to its intended environment. As shown in FIG. 4e, the network is a partially connected mesh network designed to interconnect eight subsystems utilizing four-port nodes. This configuration may be referred to as a Wagner graph. It minimizes path length, while maintaining high redundancy in case of component failure.

The low latency fiber optic local area network 10 may also include a plurality of subsystems. Each subsystem communicates with each other, and each subsystem communicates with, the network. Each subsystem has architecture selected from the group consisting of mesh architecture, bus architecture, ring architecture, star architecture, and Wagner graph architecture.

The demultiplexer 310 can be thin film based, or arrayed wavelength grating based. More advanced demultiplexers can be tunable whereby the demultiplexed wavelength statically or dynamically is tuned to a specific wavelength band. The optical power coupler 325 can be fiber based or planar lightwave circuit-based. The wavelength converters 320 can have a fixed output wavelength or a tunable output wavelength. The internal optical waveguides 151 can be fiber optic based or planar lightwave circuit based. The optic output interfaces 326 and the input fiber optic interfaces 311 can be pigtailed or connectorized. However, any types of components practicable can be utilized.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A low latency fiber optic local area network, comprising:
    a plurality of nodes, connected to one another by optical fibers, such that optical signals are transmitted out of each node and received by each node, each node having a plurality of bi-directional input/output interfaces, each bi-directional input/output interface having a demultiplexer, an optical power coupler, a plurality of wavelength converters, and a plurality optical waveguides, each optical power coupler having a fiber optic output interface, and each demultiplexer having a input fiber optic interface, the demultiplexer accepts input signals from input interface ports, the, plurality of wavelength converters rebroadcasts signals on a new carrier wavelength, the rebroadcast signals are combined by the optical power coupler, the rebroadcast signals are transmitted at output interface ports, and
    wherein the plurality of nodes do not include an optical splitter.

2. The low latency fiber optic local area network of claim 1, wherein the plurality of wavelength converters provide signal amplification.

3. The low latency fiber optic local area network of claim 1, wherein the network is configured as a mesh network, and the nodes are mesh nodes.

4. The low latency fiber optic local area network of claim 1, wherein the network is configured as a bus network, and the nodes are bus nodes.

5. The low latency fiber optic local area network of claim 1, wherein the network is configured as a star network, and the nodes are star nodes.

6. The low latency fiber optic local area network of claim 1, wherein the network is configured as a ring network, the nodes are ring nodes.

7. The low latency fiber optic local area network of claim 1, wherein the demultiplexer is thin film based.

8. The low latency fiber optic local area network of claim 1, wherein the demultiplexer is arrayed waveguide grating-based.

9. The low latency fiber optic local area network of claim 1 whereby the demultiplexer is tunable filter based.

* * * * *